United States Patent
Demmer

(10) Patent No.: US 6,956,617 B2
(45) Date of Patent: Oct. 18, 2005

(54) IMAGE SCALING AND SAMPLE RATE CONVERSION BY INTERPOLATION WITH NON-LINEAR POSITIONING VECTOR

(75) Inventor: Walter Heinrich Demmer, Nuremberg (DE)

(73) Assignee: Texas Instruments Incorporated, Dallas, TX (US)

( * ) Notice: Subject to any disclaimer, the term of this patent is extended or adjusted under 35 U.S.C. 154(b) by 390 days.

(21) Appl. No.: 10/004,699

(22) Filed: Dec. 4, 2001

(65) Prior Publication Data

US 2002/0106026 A1 Aug. 8, 2002

Related U.S. Application Data

(60) Provisional application No. 60/249,557, filed on Nov. 17, 2000.

(51) Int. Cl.[7] .................................................. H04N 7/01
(52) U.S. Cl. ..................................... 348/441; 348/581
(58) Field of Search ............................... 348/441, 571, 348/572, 581, 458; 375/232; 382/293, 298; 341/51, 61, 78, 106

(56) References Cited

U.S. PATENT DOCUMENTS

| | | | | |
|---|---|---|---|---|
| 3,623,098 A | * | 11/1971 | Jones et al. | .................... 342/91 |
| 4,868,771 A | * | 9/1989 | Quick et al. | .................... 703/8 |
| 5,574,572 A | | 11/1996 | Malinowski et al. | ........ 358/451 |
| 5,619,270 A | | 4/1997 | Demmer | ...................... 348/441 |
| 5,923,712 A | * | 7/1999 | Leyendecker et al. | ...... 375/297 |
| 6,259,389 B1 | * | 7/2001 | McGrath | ..................... 341/120 |

* cited by examiner

*Primary Examiner*—Victor R. Kostak
(74) *Attorney, Agent, or Firm*—W. Daniel Swayze, Jr.; W. James Brady; Frederick J. Telecky, Jr.

(57) ABSTRACT

A low-order polyphase interpolation filter, such as for decoding video and image signals, employs interpolation to facilitate sample rate conversion from a first rate to a second rate, which can be greater or less than the sample rate of the input signal. The interpolation applies interpolation coefficients, which are non-linear with respect to an associated positioning vector, to a set of input samples to provide desired scaling and/or conversion of the input sample into the desired output sample.

17 Claims, 13 Drawing Sheets

IMAGE SCALING AND SAMPLE RATE CONVERSION BY INTERPOLATION WITH NON-LINEAR POSITIONING VECTOR

This application claims benefit of Provisional Application No. 60/249,557 filed Nov. 17, 2000.

TECHNICAL FIELD

Generally, the present invention relates to image processing and, more particularly, to scaling and sample rate conversion of images by interpolation using non-linear positioning vectors or coefficients.

BACKGROUND OF THE INVENTION

A digital video image comprises an array of pixels, with a known number of pixels in each horizontal row and vertical column according to an associated image format. Oftentimes the image is to be displayed in a system that uses a different number of pixels in each row and/or a different number of columns from that of an input image. Accordingly, it is often desirable to scale the image for display in the new system. The particular scaling in the horizontal and vertical dimensions can be different based on the dimensions of the input image relative to the desired dimensions of the output image. Scaling also is utilized for zooming of images and/or for displaying such images in windows having freely definable size and position. Various approaches have been developed for scaling, which can vary according the source of the input video signal and the desired output format.

In general, a video signal is scaled spatially in two dimensions, namely horizontally and/or vertically. The scaling can be implemented by simple window-cropping, direct decimation, or direct repetition. One example of an existing scaling technique is to apply weighted averages to neighboring image pixels to scale a PC graphics image both vertically and horizontally to match a television resolution format. To help reduce flicker, a scan converter having frame storage capabilities sometimes is used. While this frame-based flicker reduction can improve image quality, such associated with television images, as well as have extra flexibility in its graphics interface requirements, it is not cost-efficient due to the large size required on a silicon device to provide adequate frame storage. Another type of flicker reduction technique attempts to limit each display point (pixel) on a line of an interlaced field to be vertically paired with the point (pixel) on the vertically neighboring line of the next field. Still another approach utilizes low-pass filters to filter out vertical high frequency components of original graphics in order to generate relatively smooth vertical contrast between neighboring pixels. This low-pass filtering process may include line averaging or a similar technique.

Different types of video signals have different frame rates for display on computer screens, television screens and film. For example, film material typically utilizes frame rates of 24, 25 and 30 Hz, and video usually employs frame/field rates of 50 and 60 Hz. Television displays are commercially available with picture rates of 50, 60 and 100 Hz, and can employ progressive or interlaced scanning. Simple picture rate converters repeat pictures until the next arrives, which can result in blur and/or judder when motion occurs. Similarly, de-interlacing sometimes results from repetition, or averaging of neighboring lines. The more advanced deinterlacing concepts further apply vertical-temporal processing, but even these can degrade those parts of images where motion occurs. Further complexities arise for conversion from a non-interlaced to an interlaced format, which if not accounted for can reduce imagerial details during conversion and/or to cause introduction of artifacts.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention generally relates to a low-order interpolation filter for video and/or image signals. The interpolation filter includes a positioning vector generator to generate a positioning vector indicative of a desired position of an output sample relative to a set of input samples, such as according to a scaling factor. A coefficient generator generates interpolation coefficients as a function of the positioning vector so as to vary non-linearly with respect to the positioning vector. The coefficients are associated with the input sample to provide a scaled output sample. The interpolator can be utilized to implement, for example, horizontal, vertical and/or temporal scaling. Advantageously, the use of the non-linear interpolation coefficients enables fewer taps to be utilized yet still achieve desirable image quality with reduced flicker.

Another aspect of the present invention provides a process for sample rate conversion that includes generating a positioning vector indicative of a desired relative position of an output sample relative to a set of input samples. A number of interpolation coefficients, which vary non-linearly with respect to the positioning vector, are applied to the set of input samples to weight the input samples and, in turn, convert the input samples from an input clock frequency to a desired output clock frequency. The process can be implemented in hardware and/or software, such as part of an integrated encoder and/or decoder circuit.

The following description and the annexed drawings set forth in certain illustrative aspects of the invention. These aspects are indicative, however, of but a few ways in which the principles of the invention may be employed. Other advantages and novel features of the invention will become apparent from the following detailed description of the invention when considered in conjunction with the drawings.

DETAILED DESCRIPTION OF THE INVENTION

The present invention generally relates to a polyphase interpolation filter, such as for encoding and/or decoding video and image signals. The interpolation filter employs interpolation to facilitate sample rate conversion from a first rate to a second rate, which can be greater or less than the sample rate of the input signal. In one aspect of the present invention, the interpolation is implemented as a low order filter (e.g., having less than five taps) that utilizes interpolation coefficients, all of which are non-linear with respect to an associated positioning vector. As used herein, the terms "scaling" and "sample rate conversion" and variants thereof are considered synonymous.

Figure 1:
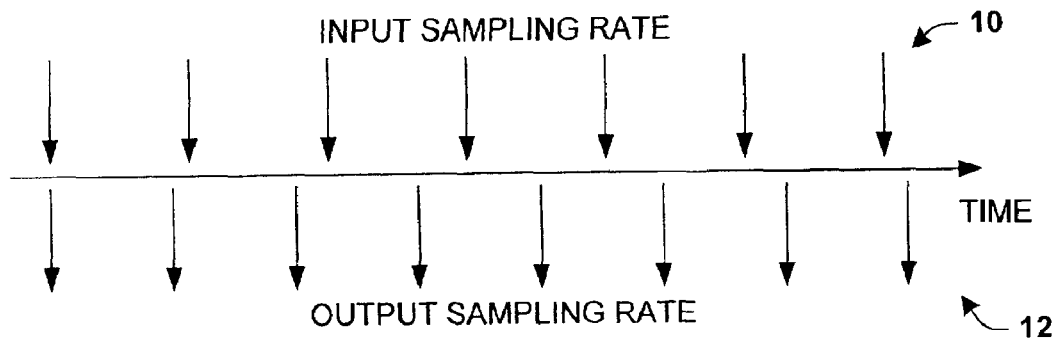
FIG. 1 is an example of a sample rate conversion between an input signal and an output signal.

FIG. 1 illustrates an example of sample rate conversion from an input sample rate 10 and an output sample rate 12 with respect to time. The sample rate conversion for image and/or video signals generally is a two dimensional problem that requires equi-distant output samples 12 to be generated from input samples originating from a different, equi-distant input sampling scheme 10. By way of example, sample rate conversion can be implemented as a sequence of horizontal and vertical sample rate conversion. The scaling in the horizontal and vertical dimensions can be the same or different. Sample rate conversion can be controlled to provide desired scaling according to a scaling factor. The scaling factor may vary according to the type of input signal and the type of output signal and/or the particular application for which the sample rate conversion is being implemented. Scaling, as described herein, also can be extended from the two-dimensional problem (involving horizontal and vertical scaling) to a three-dimensional problem that includes desired scaling in each of a horizontal dimension, a vertical dimension and a temporal dimension.

Figure 2:
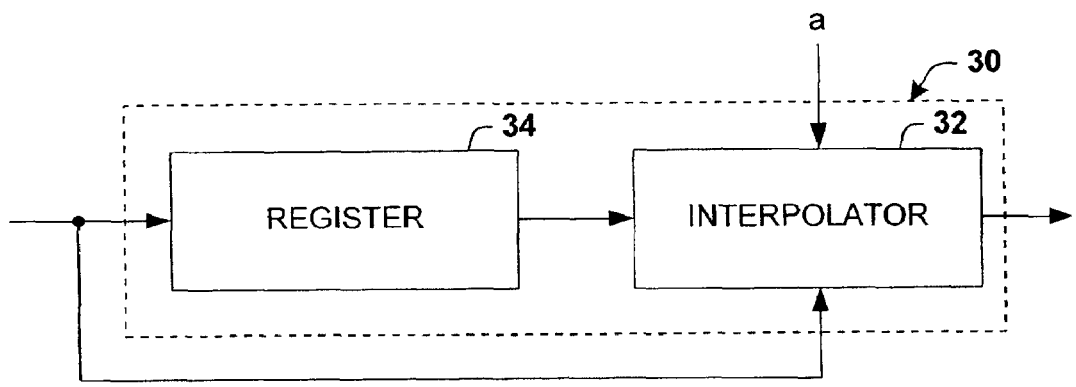
FIG. 2 is an example of a sample rate converter employing interpolation in accordance with an aspect of the present invention.

In accordance with an aspect of the present invention, sample rate conversion can be implemented by applying a polyphase interpolation filter. FIG. 2 illustrates a simplified block diagram of sample rate conversion 30 employing such an interpolation filter 32. In accordance with an aspect of the present invention, the interpolation filter 32 is a low order polyphase filter, such as having five or fewer filter taps. The number of taps defines the number of interpolation coefficients associated with the interpolation.

In accordance with an aspect of the present invention, the interpolation filter 32 performs linear interpolation of the input signal relative to two or more successive input samples, such as are stored in a register (or buffer) 34 according to the input stream of video and/or image data. The interpolation filter 32 thus computes the output sample by linearly interpolating between the stored input sample(s) and the input sample as a function of a positioning vector, indicated herein as a. The positioning vector a is functionally related to the relative position of a desired output sample versus the input samples. The output sample can be represented as polynomial having coefficients functionally related to the positioning vector a. In order to optimize the image quality resulting from the sample rate conversion employing the low order interpolation filter 32, the interpolation coefficients are non-linear with respect to the positioning vector a in accordance with an aspect of the present invention.

Figure 3:
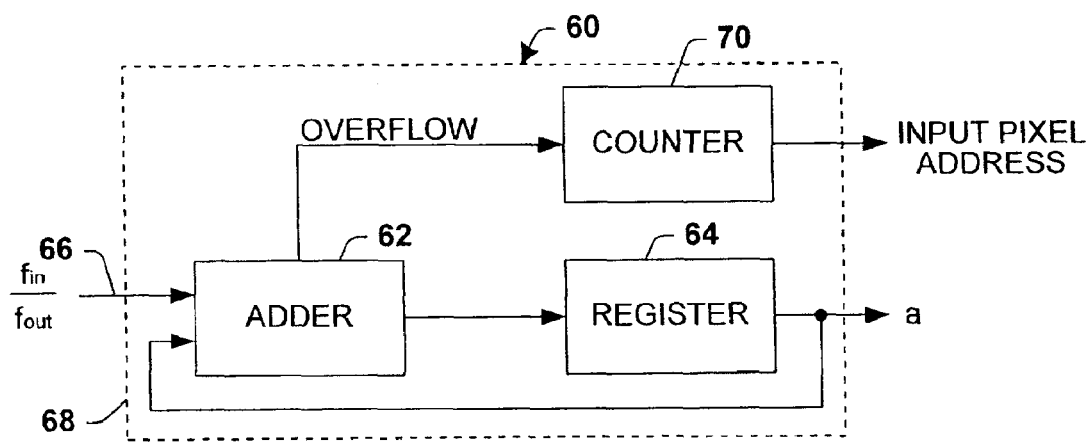
FIG. 3 is a block diagram of a discrete time oscillator for generating a positioning vector in accordance with an aspect of the present invention.

FIG. 3 illustrates an example of a Discrete Time Oscillator (DTO) 60 that is programmed and/or configured to derive an indication of the positioning vector a, which corresponds to the phase relationship for an output sample relative to a neighboring input sample. The DTO 60 includes an adder 62 that provides a summed output value to an associated register 64. The adder receives an input 66 functionally related to the desired number of output pixels versus the actual number of input pixels (e.g., a scaling factor) and another input 68 from the register corresponding to the positioning vector a. The register 64 performs an accumulator function that accumulates output values from the adder to provide a value indicative of the relative position of an output sample relative to its closest neighboring input samples. Overflow from the adder 62 is provided to an overflow counter 70. The counter 70 keeps track of overflows of the range of values of the adder, which correspond to the current input pixel address. Thus, the DTO 60 provides a positioning vector a and an address for associated each input sample.

Figure 4:
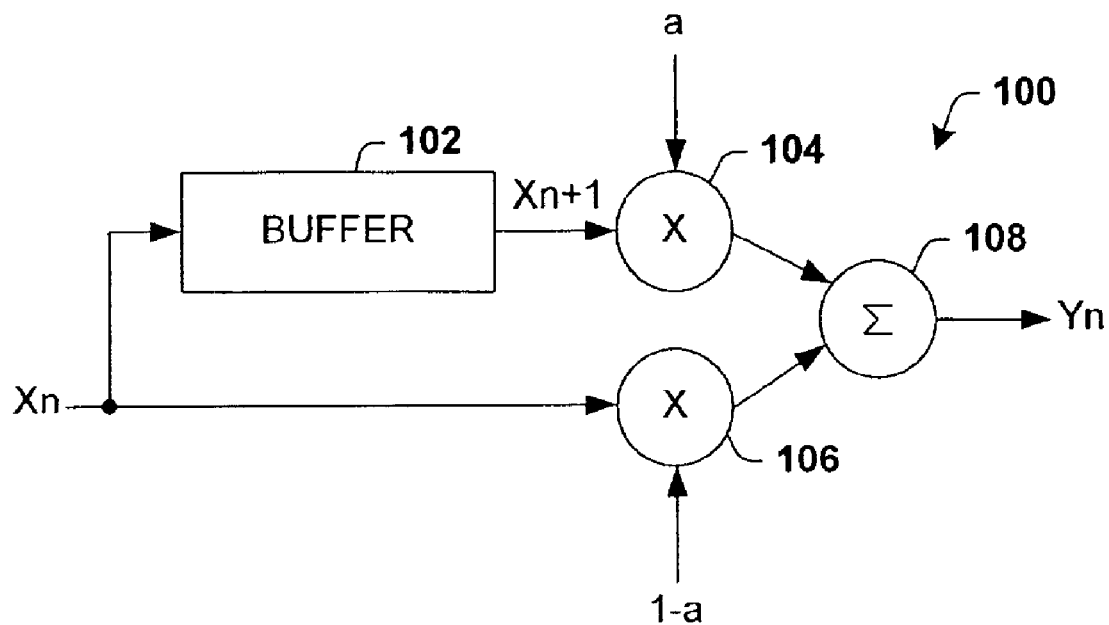
FIG. 4 is an example of a two-tap interpolation filter.

FIG. 4 illustrates an example of a traditional two-tap linear interpolator 100 that performs a weighted addition of two successive input samples $X_n$ and $X_{n+1}$ to generate a corresponding output sample $Y_n$. The interpolator 100 includes a buffer or register 102 that stores input samples, such as according to the type of scaling being performed. In this example, the buffer 102 provides the stored input sample $X_{n+1}$ when the current input sample is $X_n$. A multiplier 104 multiplies $X_{n+1}$ by the positioning vector a and another multiplier 106 multiplies the input sample $X_n$ by (1−a). The respective products are added together by a summer 108 to provide the output sample $Y_n$. The output sample $Y_n$ of the interpolator 100 thus can be expressed as:

$$Y_n = (1-a)*X_n + a*X_{n+1} \qquad \text{Eq. 1}$$

Figure 5:
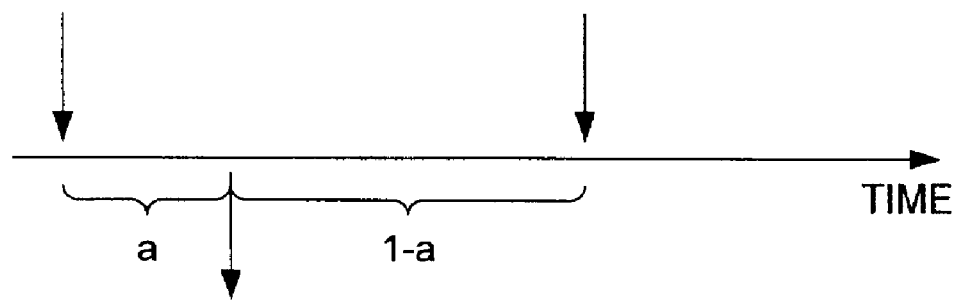
FIG. 5 is an example of sample rate conversion by the two-tap interpolation filter of FIG. 4.

An example of the sample rate conversion for the two-tap interpolator of FIG. 4 is shown in FIG. 5.

With $f_s$ indicating the output sampling frequency, the frequency dependent gain can be represented as:

$$G(f, a) = \left| (1-a) + a \cdot e^{j\frac{f}{f_s} \cdot 2\pi} \right|. \qquad \text{Eq. 2}$$

For the case of the two tap interpolator (e.g., 100 FIG. 4), the terms "(1−a)" and "a" of the gain define interpolation coefficients of the interpolator. As previously described, the term "a" also can be characterized as a positioning vector for the interpolation.

Figure 6:
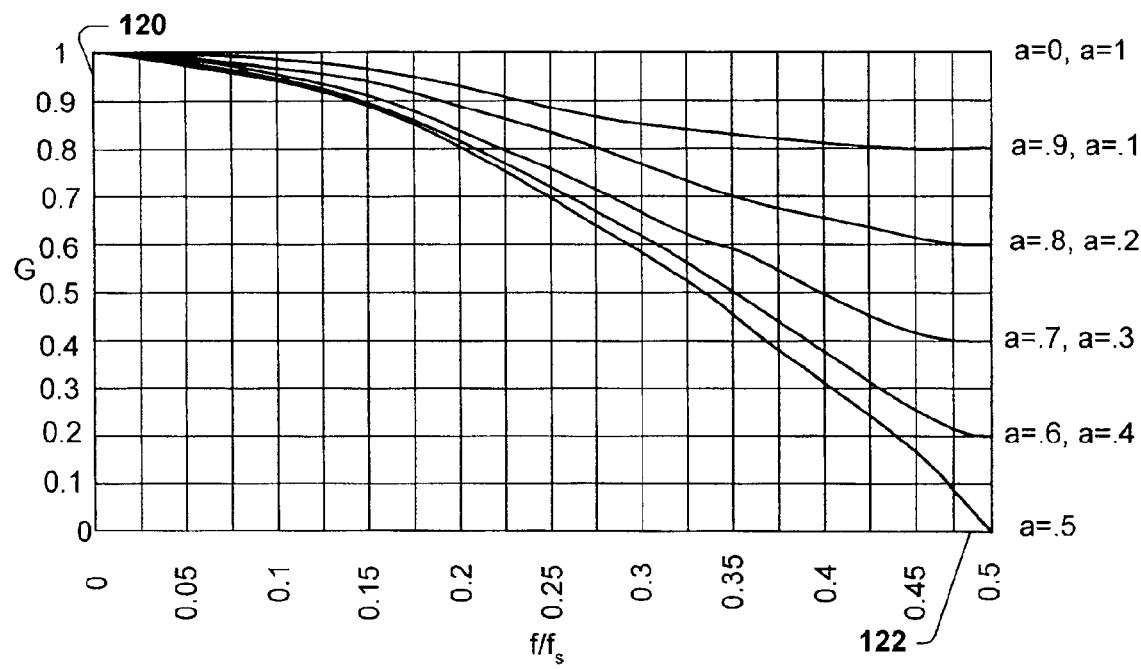
FIG. 6 is a graph of gain versus relative frequency, illustrating a frequency response for the filter of FIG. 4.

FIG. 6 is a graph in which gain is plotted on an ordinate axis 120 versus relative frequency plotted on an abscissa axis 122. The graph illustrates the frequency response for a conventional two-tap interpolation filter for the gain described by Eq. 2 for a plurality of positioning vector values. A traditional two-tap interpolator, such as shown in FIG. 4, introduces an undesirable effect of non-constant frequency dependent gain as well as non-linear phase. Thus, as shown in FIG. 6, the gain at higher frequencies significantly depends on the position of the output sample relative to the respective input samples, namely it varies greatly as a function of the positioning vector a. For example, at a signal frequency of ½ the output sampling frequency, the signal might even disappear completely. This frequency response also indicates a signal-to-noise ratio deteriorating with increasing signal frequency as the sample value becomes increasingly dependent on the relative sample position.

A phase response for the two-tap filter of FIG. 4 can be expressed as:

$$\phi(f, a) = \frac{180}{\pi} \cdot \arctan\left[\frac{a \cdot \sin\left(\frac{f}{f_s} \cdot 2 \cdot \pi\right)}{(1-a) + a \cdot \cos\left(\frac{f}{f_s} \cdot 2 \cdot \pi\right)}\right] \qquad \text{Eq. 3}$$

Figure 7:
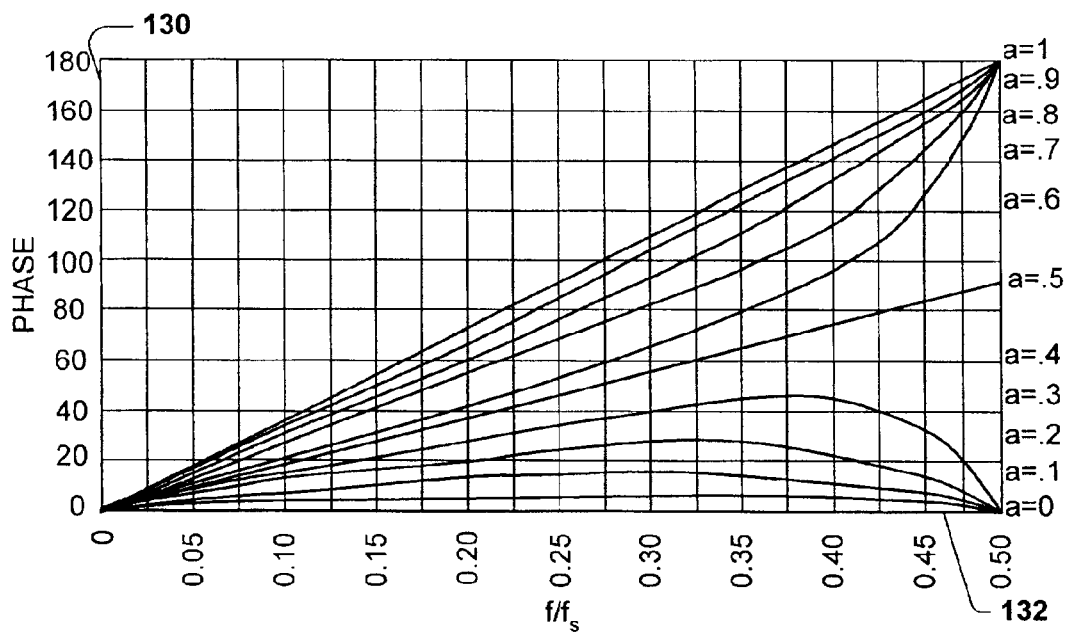
FIG. 7 is a graph of phase versus relative frequency, illustrating a phase response for the filter of FIG. 4.

FIG. 7 depicts the phase response for the two-tap interpolator 100 of FIG. 2 according to Eq. 3, in which the phase angle is plotted on an ordinate axis 130 and relative frequency is plotted on an abscissa axis 132 for a plurality of positioning vectors. The phase response shows that the interpolation filter 100 (FIG. 2) only provides a linear phase under the condition of symmetric interpolation coefficients (e.g., positioning vectors a=0, a=0.5, a=1). For other coefficients the phase tends to be increasingly non-linear versus the signal frequency, which results in a non-constant group delay for such situations. The group delay of a filter is a distortion parameter that provides a measurement of the average delay of the filter as a function of frequency. While some of the problems associated with such a two-tap filter can be compensated by post-filtering techniques, the combination of problems evident from the gain and phase responses require quite complex post-filtering solutions, which generally are not cost effective.

In view of the gain and phase responses for the two-tap interpolator 100, as shown in FIGS. 6 and 7, and recognizing the fact that low frequencies are less affected by timing uncertainties than are higher frequencies, the uncertainties at higher frequencies can be compensated, in accordance with an aspect of the present invention, by employing non-linear interpolation, such as can be implemented as a modified non-linear positioning vector a'.

Figure 8:
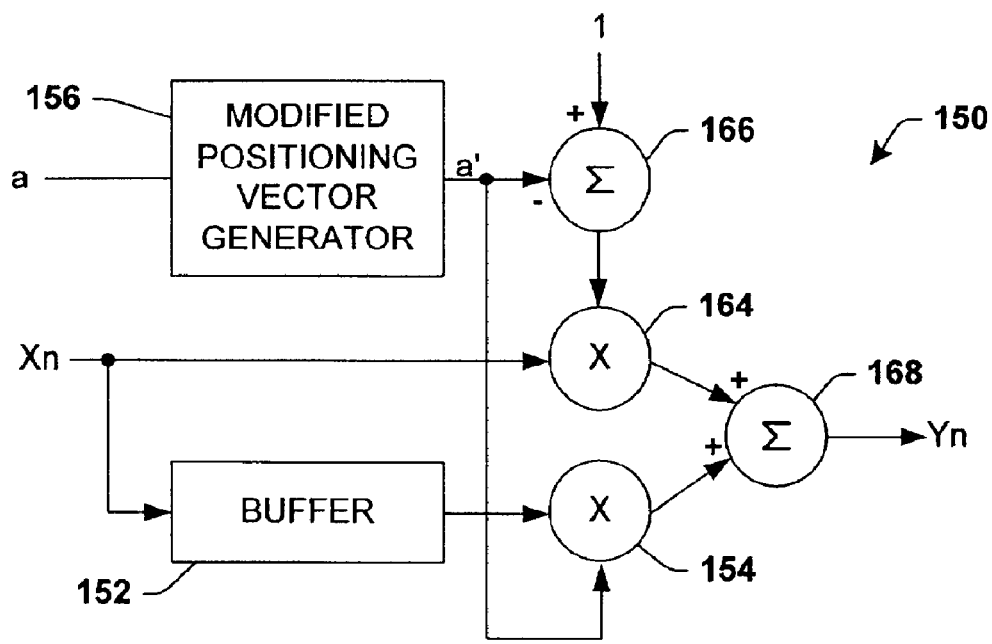
FIG. 8 is an example of a two-tap interpolation filter in accordance with an aspect of the present invention.

FIG. 8 illustrates an example of a two-tap interpolator 150 in accordance with an aspect of the present invention. The interpolator 150 performs a weighted addition of two successive input samples $X_n$ and $X_{n+1}$ to generate a corresponding scaled output sample $Y_n$. The interpolator 150 includes a buffer or register 152 that stores input samples, such as according to the type of scaling being performed (e.g., scaling horizontally, vertically, or temporally). In this example, the buffer provides the stored input sample $X_{n+1}$ when the current input sample is $X_n$. A multiplier 154 multiplies $X_{n+1}$ by a modified positioning vector a', which is provided by a modified positioning vector (or coefficient) generator 156. The generator 156 derives the modified positioning vector a' so as to be non-linear with respect to a positioning vector a. For the case of horizontal scaling, the positioning vector is an interpixel positioning vector. Similarly, for vertical scaling the positioning vector corresponds to an interline positioning vector, and for temporal scaling an interframe positioning vector. The positioning vector can be provided by a DTO, such as shown and described with respect to FIG. 3.

By way of example, the generator 156 can be a look-up table programmed to provide the modified positioning vector a' as a function of the positioning vector a. In one example, the modified positioning vector a' can be expressed as:

$$a' = \frac{1}{1 + \cot\left(\frac{\pi}{2} \cdot a\right)} \qquad \text{Eq. 4}$$

Figure 9:
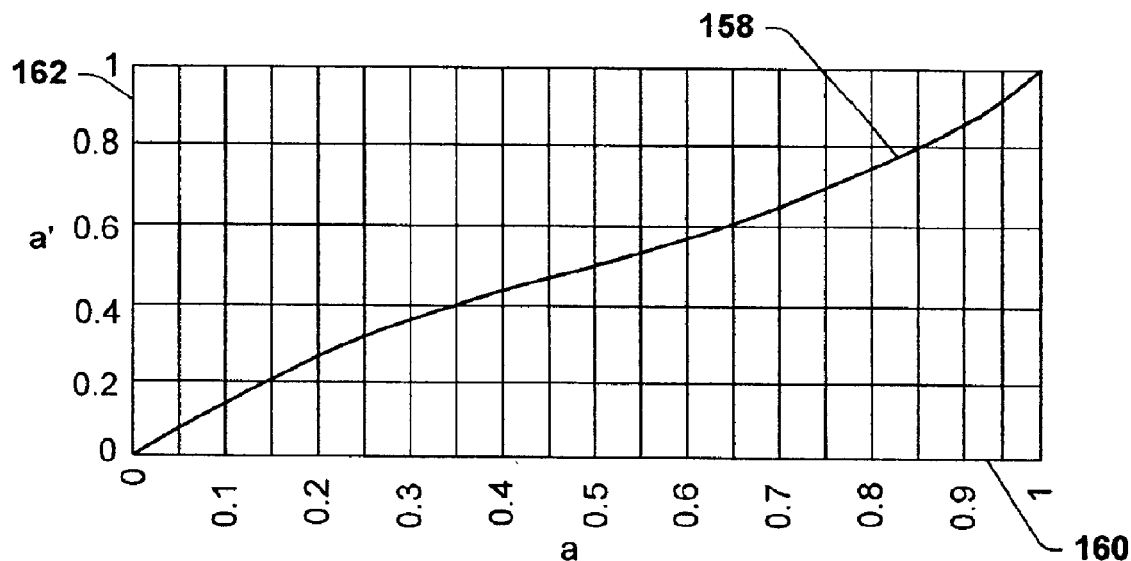
FIG. 9 is an example of modified positioning vector that can be utilized by the filter of FIG. 8.

FIG. 9 depicts an example of a graph of a modified positioning vector 158 according to Eq. 4, in which a positioning vector a is plotted on an abscissa axis 160 and a corresponding modified positioning vector a' is plotted on the ordinate 162. The modified positioning vector 158 can be used to program a look-up table for generating a non-linear positioning vector, which defines interpolation coefficients for the two-tap interpolator in accordance with an aspect of the present invention. As shown in FIG. 9, the modified positioning vector 158 is non-linear with respect to the positioning vector a.

Referring back to FIG. 8, the interpolator 150 includes a multiplier 164 that multiplies the input $X_n$ by the quantity (1−a') which is provided by an associated adder 166. The respective products from the multipliers 154 and 164 are added together by a summer 168 to provide the scaled output sample $Y_n$. As described herein, the non-linearity of the modified positioning vector facilitates compensation of timing uncertainties associated with interpolation at higher frequencies. The gain function for the two-tap interpolation employing a modified positioning vector, in accordance with an aspect of the present invention, is hardly affected when compared to the conventional two-tap example. The phase response for the two-tap interpolator also has been linearized for the signal frequency of $f=\frac{1}{4}*f_s$, where $f_s$ is the sampling frequency.

Figure 10:
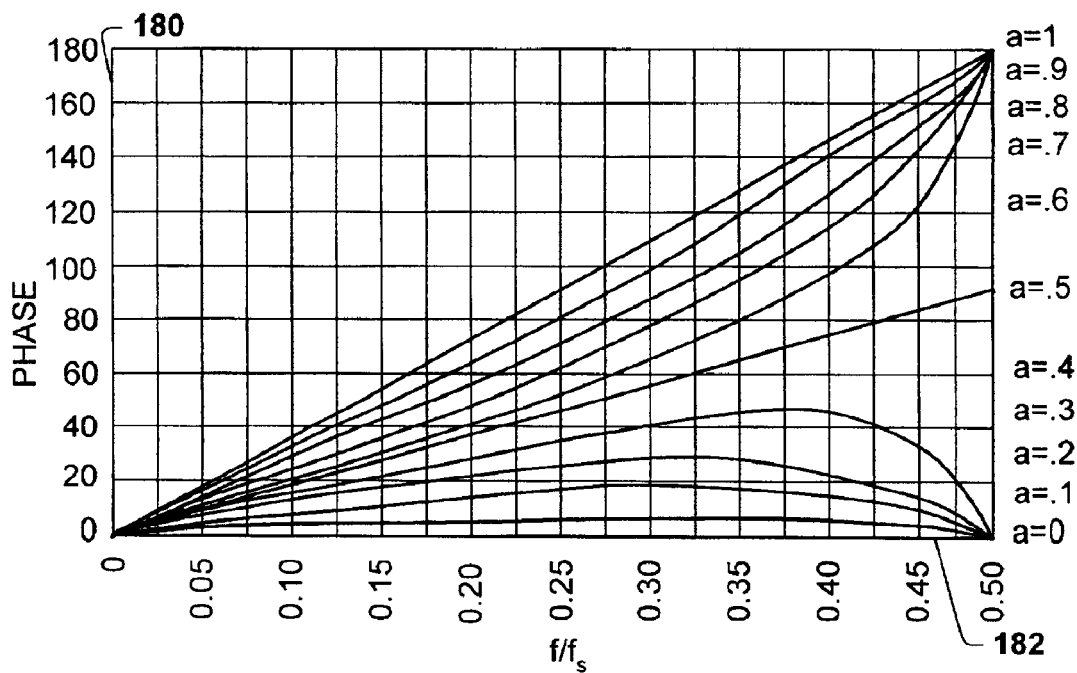
FIG. 10 is a graph of phase versus relative frequency, illustrating a phase response for the filter of FIG. 8.

FIG. 10 illustrates an example of a phase response for a two-tap interpolating employing a modified positioning vector in accordance with an aspect of the present invention. In FIG. 10, the phase angle (in degrees) is plotted on an ordinate 180 versus relative frequency on an abscissa 182. FIG. 10 shows that the phase response has been linearized for the signal frequency of $f=\frac{1}{4}*f_s$.

Figure 11:
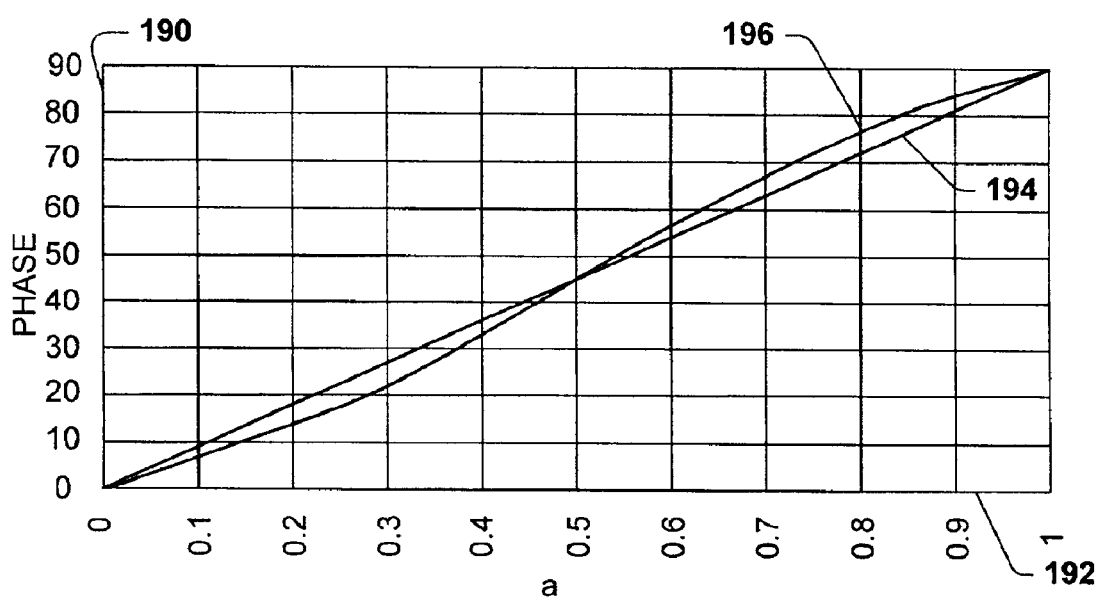
FIG. 11 is a graph of the phase shift, illustrating a comparison of phase shift for the filters of FIGS. 4 and 8 at a known frequency.

FIG. 11 illustrates a graph of phase angle (plotted on an ordinate 190 in degrees) versus a positioning vector (plotted on an abscissa 192) for a frequency of $f=\frac{1}{4}*f_s$. In particular, FIG. 11 shows phase shift for a two-tap interpolator employing a modified version of the positioning vector (indicated at 194) relative to phase shift for an unmodified positioning vector (indicated at 196) at the frequency of $f=\frac{1}{4}*f_s$. From FIG. 11, it is evident that the phase shift 194 for the case of the modified positioning vector exhibits improved linearity relative to the phase shift 196 for the unmodified case. By employing a modified positioning vector in two-tap interpolation, in accordance with an aspect of the present invention, the overall image quality exhibits improved performance, even at high frequencies, such as when compared to a conventional two-tap interpolator.

In order to objectify image quality, an image quality indicator (IQI) can be computed as a logarithmical measure of the sum of squared errors over a set of frequencies as well as a set of positioning values a and further multiplied with a set of frequency dependent weighting factors. The weighting factors, for example, represent an EIA noise weighting function, such as defined in EIA/TIA-250-CF, which is incorporated herein by reference. Thus, IQI can be regarded as the perceivable precision at which the pattern of a white noise input image is reproduced after scaling. By way of further illustration, IQI can be expressed as follows:

$$IQI = 10 \cdot \log \left[ \frac{1}{2 \cdot \left( \frac{a_{max}}{\Delta_a} + 1 \right) \cdot \left( \frac{f_s}{2 \cdot \Delta_f} + 1 \right)} \cdot \sum_{a=0}^{a_{max}} \sum_{f=0}^{\frac{f_s}{2}} \left| \left[ \left[ a' + (1-(a')) \cdot e^{-j\frac{f}{f_s}4\pi} \right] - e^{-j(1-a)\frac{f}{f_s}4\pi} \right] \cdot \frac{1}{f+1} \right|^2 \right]$$

Eq. 5

Thus, for the two-tap interpolator employing the modified positioning vector, in accordance with an aspect of the present invention, the IQI is about 27.8 dB.

In order to improve upon the gain modulation property associated with the two-tap interpolator, additional taps of the polyphase filter can be introduced and still provide a low order filter in accordance with an aspect of the present invention. With a third tap implemented as part of an interpolation filter (e.g., a three-tap filter), an additional degree of freedom can be achieved. The additional degree of freedom enables a second frequency (apart from DC) to be defined to perform unity gain.

Figure 12:
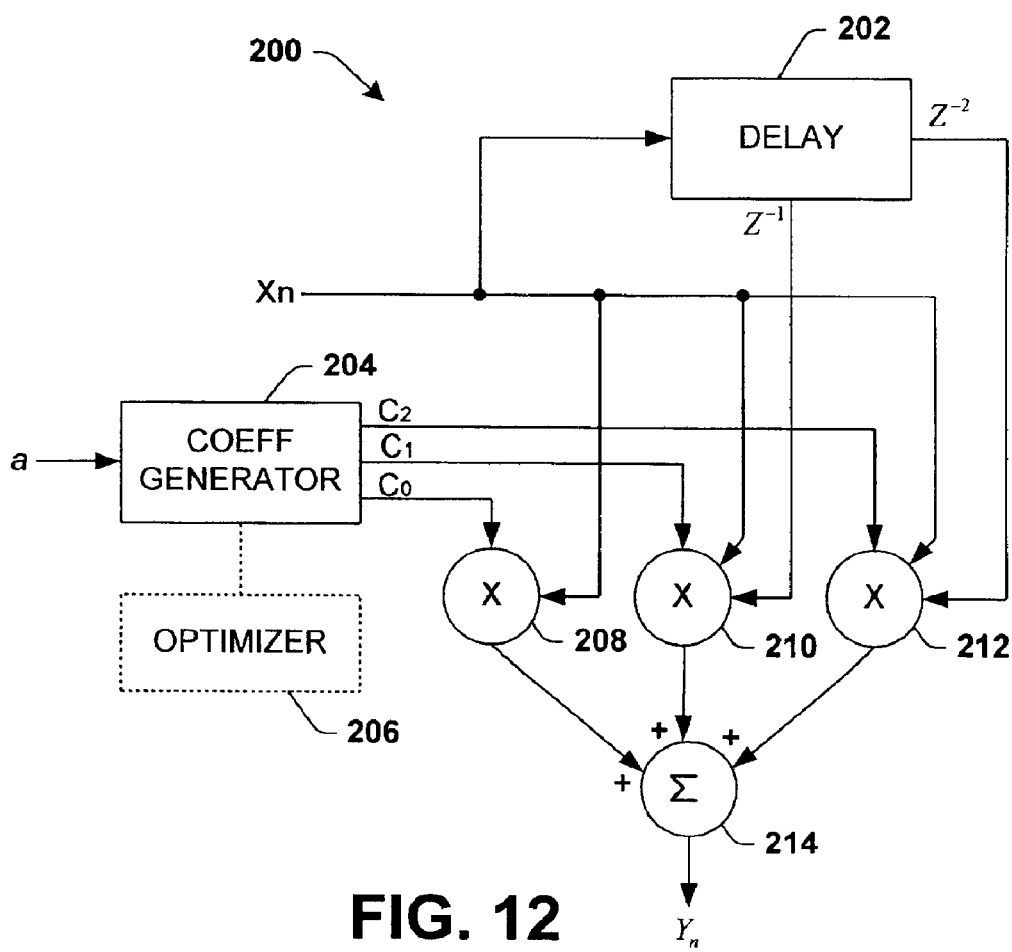
FIG. 12 is an example of a three-tap interpolation filter in accordance with an aspect of the present invention.

FIG. 12 illustrates an example of a three-tap filter 200, in accordance with an aspect of the present invention. The filter receives an input sample $X_n$, which is provided to a delay component 202. The delay component 202, which can include a buffer or register, is programmed and/or configured for storing an appropriate amount of data and generating desired delay elements $Z^{-1}$ and $Z^{-2}$ for the interpolation. The delay component 202 and, in turn, the delay elements generated by the delay component 202 will depend on the type of scaling being performed (e.g., a horizontal, vertical, temporal). The delay component 202, for example, can implement a series of delay stages for generating respective delay elements for associated with the interpolation coefficients.

For example, for horizontal scaling the delay element is functionally related to delay associated with processing a pixel. For the situation of vertical scaling, the delay element is further functionally related to the number of pixels per line. Similarly, for temporal scaling (e.g., between frames) the delay element is functionally related to both the number of pixels per line and the number of lines per frame (e.g., the number of pixels per frame). It is to be appreciated that because vertical and temporal scaling require additional memory (e.g., registers) generally proportional to the number of pixels associated therewith, it is desirable to minimize the number of taps and thereby further reduce the memory required. For sake of brevity, the example of FIG. 12 is shown and described for a horizontal scaling, although those skilled in the art will understand and appreciate that the principals are equally applicable and can be extended to other types of scaling, such as vertical and/or temporal scaling.

The interpolator 200 also includes a coefficient generator 204 that derives interpolation coefficients $C_2$, $C_1$, and $C_0$ based on a positioning vector a. The positioning vector a, for example, can be provided by a DTO, such as shown and described with respect to FIG. 3. The positioning vector a defines a relative position of an output sample versus an input sample according to a desired scaling factor. In accordance with an aspect of the present invention, the coefficient generator derives all interpolation coefficients $C_2$, $C_1$, and $C_0$ to be non-linear with respect to the positioning vector a. In order to derive a desired set of coefficients for a given positioning vector, the coefficient generator 204 can include or be associated with an optimizer 206. The associated optimizer 206 can be employed to optimize the coefficients for a given application according to the IQI. Such optimization can be derived for a given application and stored within memory (not shown) in the coefficient generator 204. For example, the coefficients can be stored in a lookup table that determines a set of the coefficients according to the positioning vector a. Alternatively, if processing capabilities permit, the coefficient generator 24 and optimizer 206 can derive the coefficients by employing a suitable optimization technique in real time as a function of the positioning vector a.

The interpolator 200 also includes multipliers 208, 210 and 212 for multiplying the coefficients $C_2$, $C_1$, and $C_0$ by the input sample Xn and associated delay elements. In particular, the multiplier 208 multiplies the input sample by $C_0$, the multiplier 210 multiplies the input sample by $C_1$ and $Z^{-1}$, and the multiplier 212 multiplies the input sample by $C_2$ and $Z^{-2}$. The products from each of the multipliers are then aggregated by an adder 214 to provide the output sample $Y_n$. Thus, the output sample $Y_n$ defines a polynomial that can be expressed as:

$$Y_n = C_0 \cdot X_n + C_1 \cdot X_n \cdot Z^{-1} + C_2 \cdot X_n \cdot Z^{-2}$$

Eq. 6

The interpolator 200 enables real time scaling with improved image quality and efficiency, such as by mitigating flicker and/or aliasing of the output image. In addition, because such improved image quality can be obtained with a low order filter, the complexity of the filter and required memory for buffering the image data is reduced proportionally. It is to be understood and appreciated that the interpolation of Eq. 6 further can be extended for implementing vertical and/or temporal scaling, as represented in Eqs. 7 and 8.

$$Y_n = C_0 \cdot X_n + C_1 \cdot X_n \cdot Z^{-l} + C_2 \cdot X_n \cdot Z^{-2l} \qquad \text{Eq. 8}$$

where l is the number of pixels per line $$Y_n = C_0 \cdot X_n + C_1 \cdot X_n \cdot Z^{-lm} + C_2 \cdot X_n \cdot Z^{-2lm} \qquad \text{Eq. 9}$$

where
 l is the number of pixels per line; and
 m is the number of lines per frame By way of further example, assume that a second frequency for performing unity gain in a three tap interpolator, in accordance with an aspect of the present invention, is chosen to be $\frac{1}{4} \cdot f_s$. Interpolation coefficients for the three-tap interpolator can be derived by optimizing the IQI (Eq. 5), such as by Monte Carlos analysis or employing other optimization techniques. Each of the coefficients varies non-linearly with respect to the positioning vector a. For example, it is known that $C_0 + C_1 + C_2 = 1$, which provides that $$C_0 + C_1 \cdot e^{-j\frac{\pi}{2}} + C_2 \cdot e^{-j\pi} = e^{-j\frac{\pi}{2}} + a \cdot e^{j\frac{\pi}{2}} \qquad \text{Eq. 9}$$

This, in turn, results an desired set of interpolation coefficients as follows:

$$C_2 = \left(\frac{1}{2} - \sqrt{\frac{1}{2}}\right) \cdot \left[1 - 4 \cdot \left(a - \frac{1}{2}\right)^2\right] \qquad \text{Eq. 10}$$

$$C_1 = \cos\left(a \cdot \frac{\pi}{2}\right) \qquad \text{Eq. 11}$$

$$C_0 = 1 - C_1 - C_2 \qquad \text{Eq. 12}$$

Figure 13:
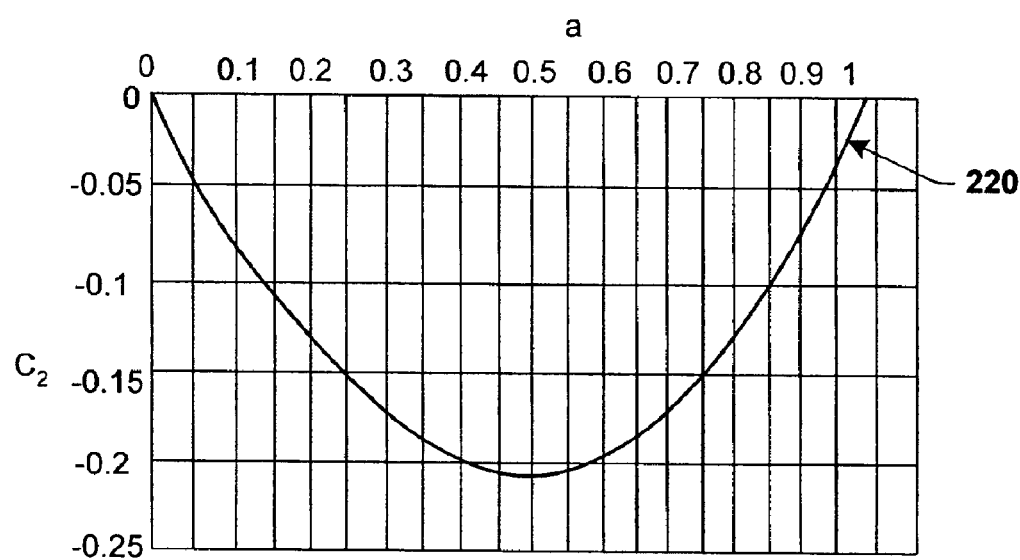
FIG. 13 is an example of an interpolation coefficient for a three-tap interpolator in accordance with an aspect of the present invention.
Figure 14:
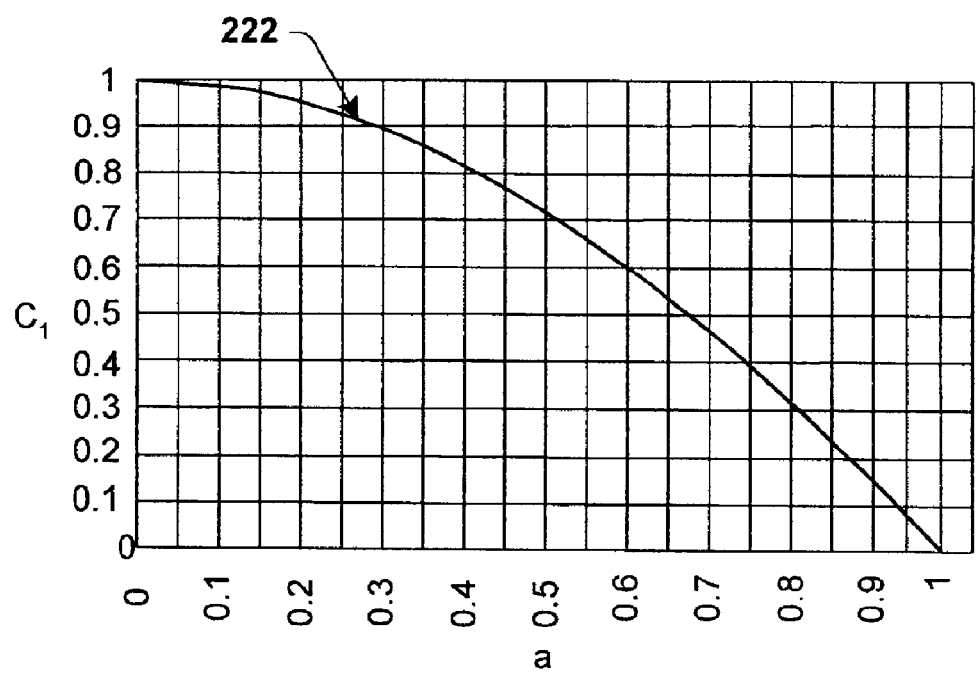
FIG. 14 is an example of another interpolation coefficient for a three-tap interpolator in accordance with an aspect of the present invention.
Figure 15:
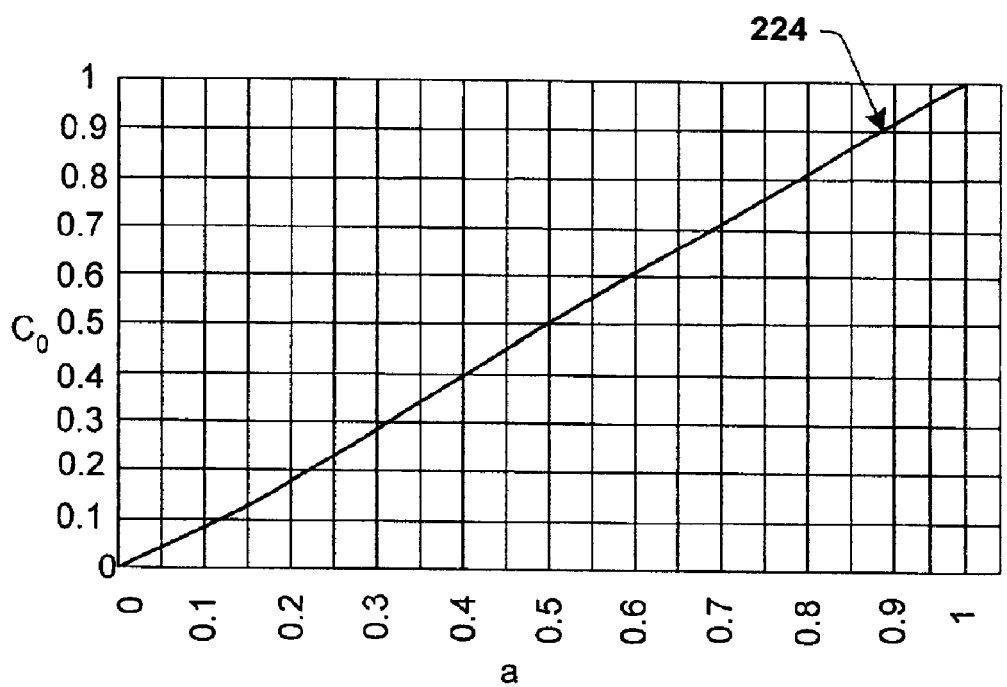
FIG. 15 is an example of yet another interpolation coefficient for a three-tap interpolator in accordance with an aspect of the present invention.

FIGS. 13–15 depict graphs plotting each of the respective coefficients $C_2$, $C_1$, and $C_0$ described by Eqs. 10–12. In particular, FIG. 13 shows a graph of $C_2$, indicated at 220, plotted as a function of the positioning vector a. FIG. 14 depicts a graph of $C_1$, indicated at 222, plotted as a function of the positioning vector a. And, FIG. 15 is a graph 224 of $C_0$ plotted as a function of the positioning vector a. The graphs 220, 222, and 224 thus demonstrate that each of the interpolation coefficients $C_2$, $C_1$, and $C_0$ for the three-tap interpolation filter, in accordance with an aspect of the present invention, is non-linear with respect to the positioning vector a.

A gain function G for the three-tap interpolator of this example can be expressed as a function of frequency and the positioning vector a, as follows:

$$G(f, a) = \left| C_0 + C_1 \cdot e^{-j\frac{f}{f_s} 2\pi} + C_2 \cdot e^{-j\frac{f}{f_s} 4\pi} \right|. \qquad \text{Eq. 13}$$

Figure 16:
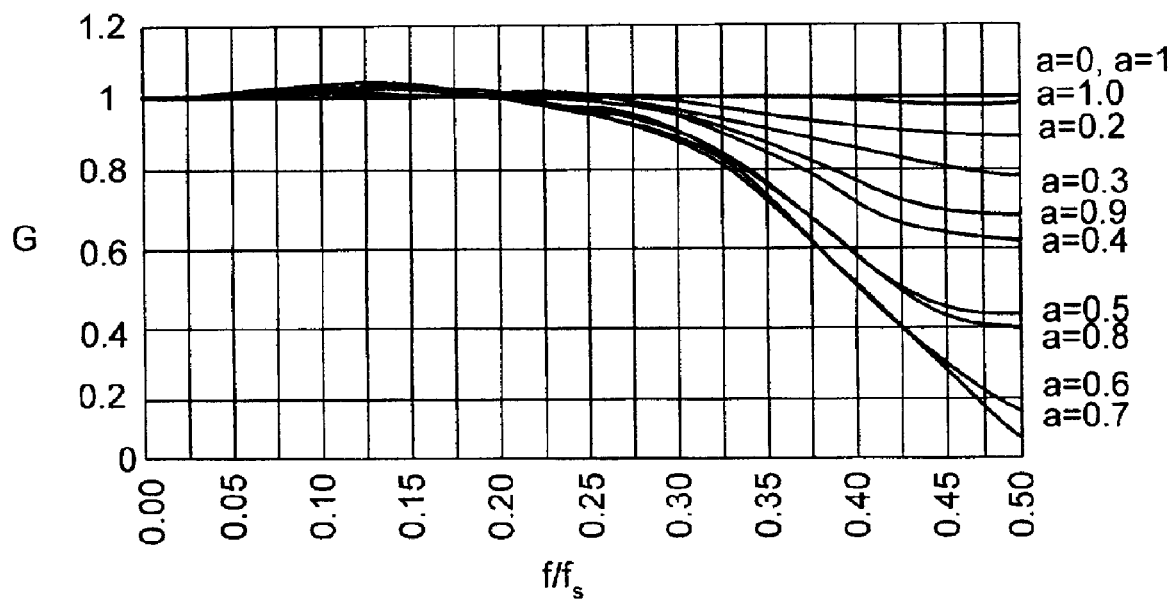
FIG. 16 is a graph of gain versus relative frequency, illustrating a frequency response for a three-tap interpolator in accordance with an aspect of the present invention.

FIG. 16 is a graph for the gain function of Eq. 13 in which the gain is plotted versus the relative frequency ($f/f_s$). A phase response, which can be expressed according to Eq. 14, is shown in FIG. 17 for the three-tap interpolator in accordance with an aspect of the present invention.

$$\phi(f, a) = \frac{180}{\pi} \cdot \arctan\left[\frac{c_1 \cdot \sin\left(\frac{f}{f_s} \cdot 2 \cdot \pi\right) + c_2 \cdot \sin\left(\frac{f}{f_s} \cdot 4 \cdot \pi\right)}{c_0 + c_1 \cdot \cos\left(\frac{f}{f_s} \cdot 2 \cdot \pi\right) + c_2 \cdot \cos\left(\frac{f}{f_s} \cdot 4 \cdot \pi\right)}\right] \qquad \text{Eq. 14}$$

Figure 17:
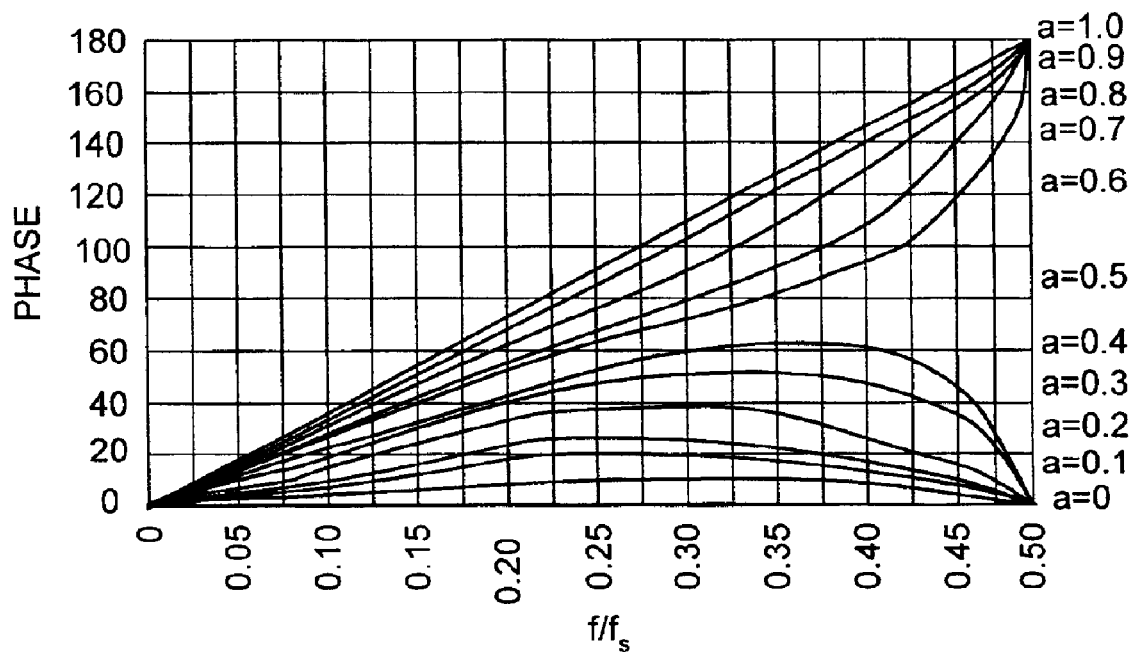
FIG. 17 is a graph of phase versus relative frequency, illustrating a phase response for a three-tap interpolator in accordance with an aspect of the present invention.

From FIGS. 16 and 17, it is shown that the three tap interpolator employing coefficients non-linear in the positioning vector, in accordance with an aspect of the present invention, provides improved image quality, such as when compared to the two-tap interpolators described herein. For example, employing the IQI of Eq. 5, the three-tap interpolator provides a quantifiable IQI value of about 29.776 dB.

It is to be appreciated that further improvements in the image quality can be obtained by increasing the number of taps to provide a four-tap interpolation filter programmed and/or configured in accordance with an aspect of the present invention. Similarly to the three-tap filter, a set of coefficients can be derived for a four-tap interpolator, which coefficients are all non-linear with respect to a positioning vector.

For example, by employing an optimization technique (e.g., Monte Carlos analysis) in conjunction with the IQI of Eq. 5, a set of coefficients $C_3$, $C_2$, $C_1$ and $C_0$ can be derived for the four-tap filter. The values of the coefficients thus can be expressed as:

$$C_3 = \frac{1 - \sqrt{2}}{4} \cdot \left[1 - 4 \cdot \left(a - \frac{1}{2}\right)^2\right] \qquad \text{Eq. 15}$$

$$C_2 = \cos\left(a \cdot \frac{\pi}{2}\right) + C_3 \qquad \text{Eq. 16}$$

$$C_1 = 1 - C_2 - 2 \cdot C_3 \qquad \text{Eq. 17}$$

$$C_0 = C_3 \qquad \text{Eq. 18}$$

Figure 18:
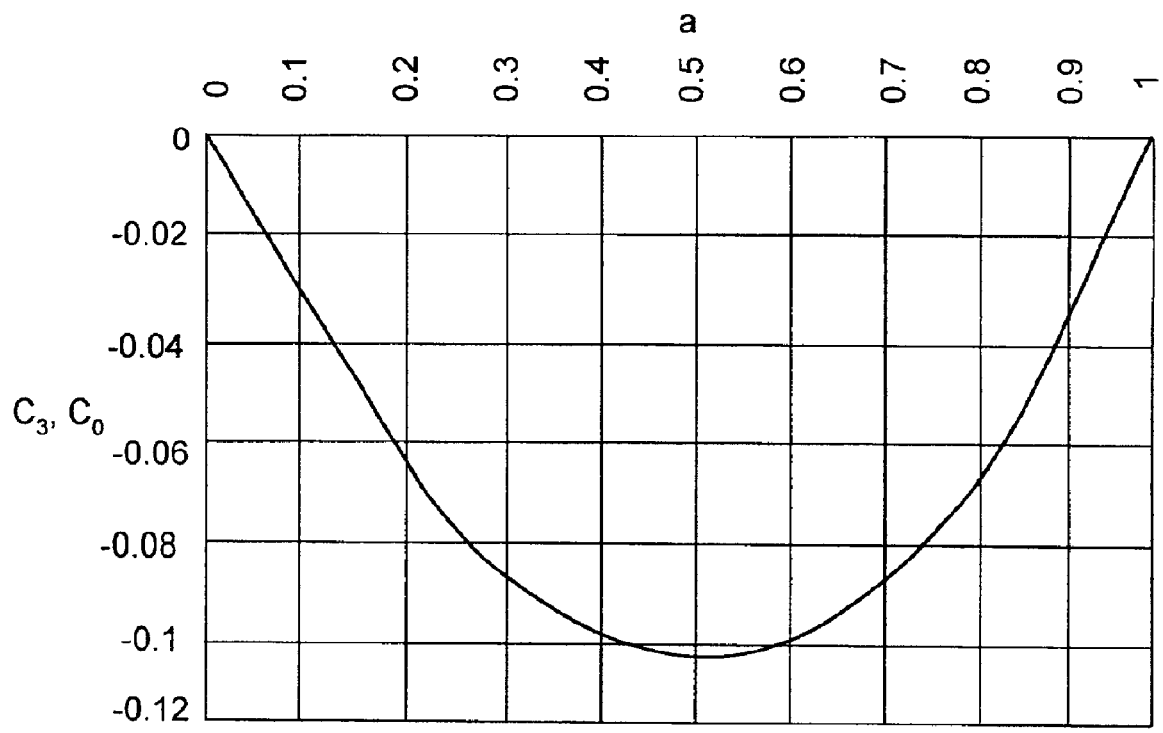
FIG. 18 is an example of symmetric interpolation coefficients for a four-tap interpolator in accordance with an aspect of the present invention.
Figure 19:
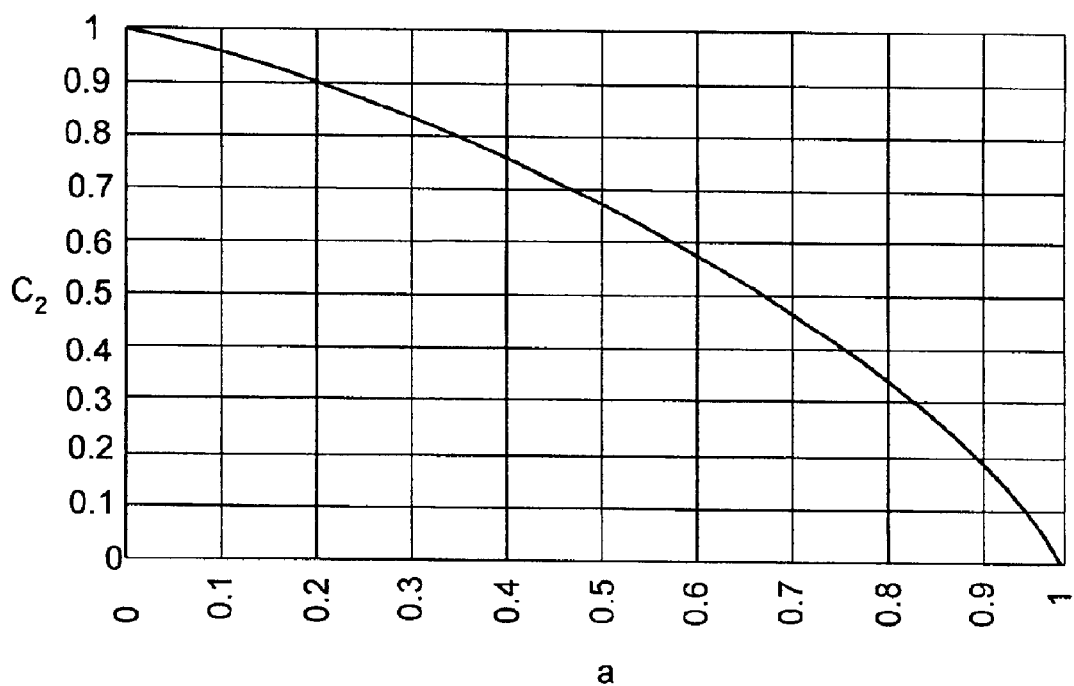
FIG. 19 is an example of another interpolation coefficient for a four-tap interpolator in accordance with an aspect of the present invention.
Figure 20:
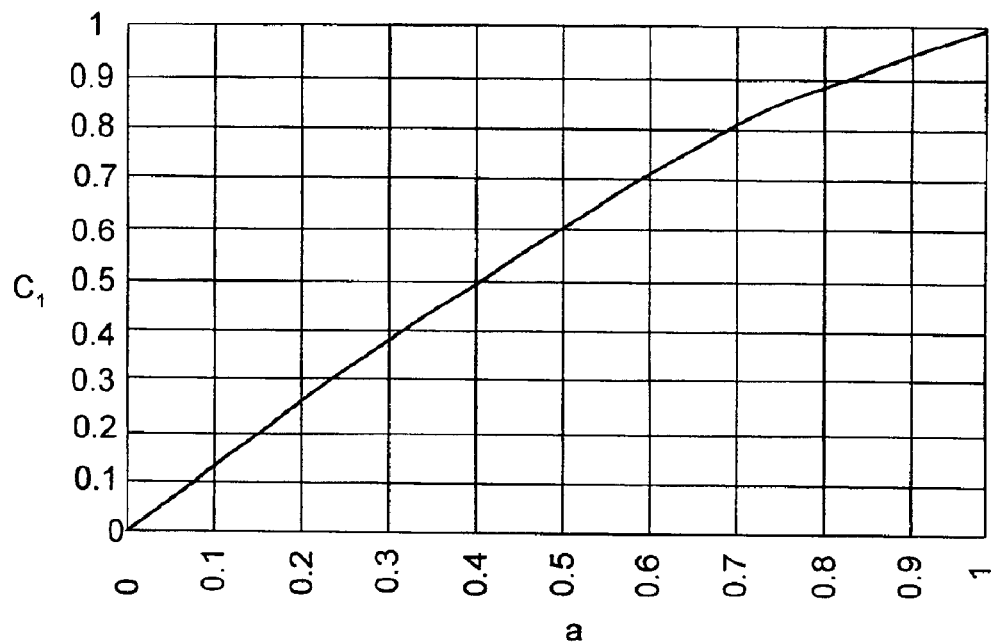
FIG. 20 is an example of yet another interpolation coefficient for a four-tap interpolator in accordance with an aspect of the present invention.

Because of symmetry associated with a four-tap filter, two of the coefficients $C_3$ and $C_0$ are identical. Examples of non-linear interpolation coefficients plotted as a function of the positioning vector a according to Eqs. 15–18, in accordance with an aspect of the present invention, are depicted in FIGS. 18, 19, and 20.

A gain function for a four-tap filter configured for horizontal scaling in accordance with an aspect of the present invention can be expressed as:

$$G(f, a) = \left| c_0 + c_1 \cdot e^{-j\frac{f}{f_s} 2\pi} + c_2 \cdot e^{-j\frac{f}{f_s} 4\pi} + c_3 \cdot e^{-j\frac{f}{f_s} 6\pi} \right| \qquad \text{Eq. 19}$$

Figure 21:
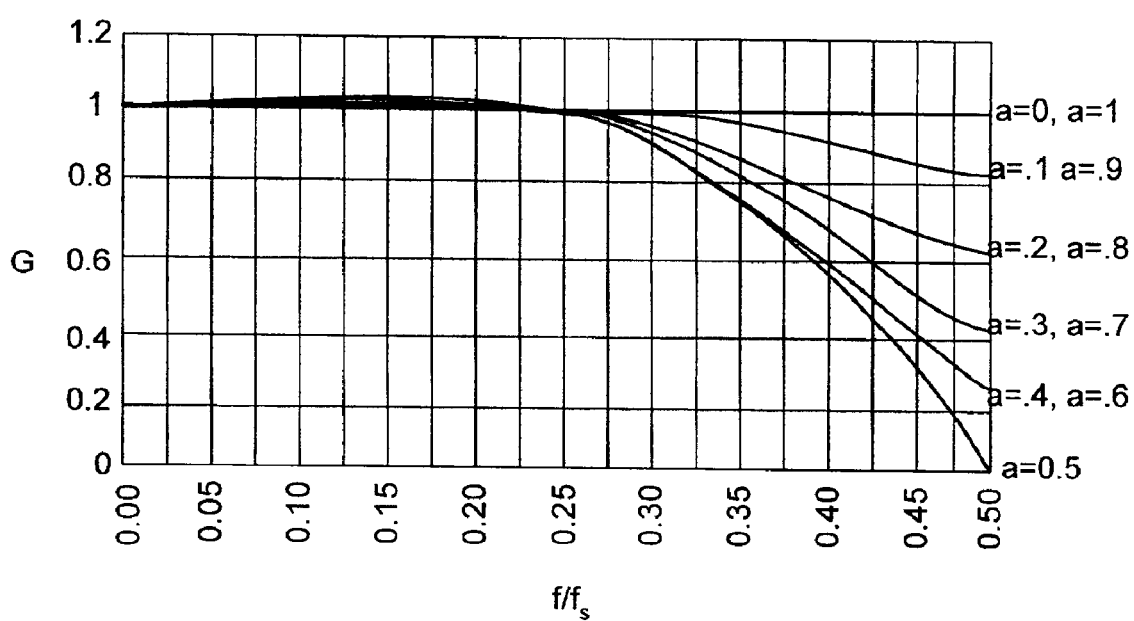
FIG. 21 is a graph of gain versus relative frequency, illustrating a frequency response for a four-tap interpolator in accordance with an aspect of the present invention.

It is to be appreciated that the gain function could be extended for vertical or temporal scaling, such as by adding appropriate terms to accommodate the increased number of pixels associated with such scaling. The gain function of Eq. 19 is plotted in FIG. 21, in which the gain G is plotted versus relative frequency for a plurality of positioning vector values. The gain G is symmetric about the positioning vector of a=0.5 due to symmetry associated with the four tap filter.

A phase response for the four-tap filter, in accordance with an aspect of the present invention, can be expressed as follows:

$$\phi(f, a) = \frac{180}{\pi} \cdot \arctan\left[\frac{C_1 \cdot \sin\left(\frac{f}{f_s} \cdot 2 \cdot \pi\right) + C_2 \cdot \sin\left(\frac{f}{f_s} \cdot 4 \cdot \pi\right) + C_3 \cdot \sin\left(\frac{f}{f_s} \cdot 6 \cdot \pi\right)}{C_0 + C_1 \cdot \cos\left(\frac{f}{f_s} \cdot 2 \cdot \pi\right) + C_2 \cdot \cos\left(\frac{f}{f_s} \cdot 4 \cdot \pi\right) + C_3 \cdot \cos\left(\frac{f}{f_s} \cdot 6 \cdot \pi\right)}\right]$$

Eq. 20

Figure 22:
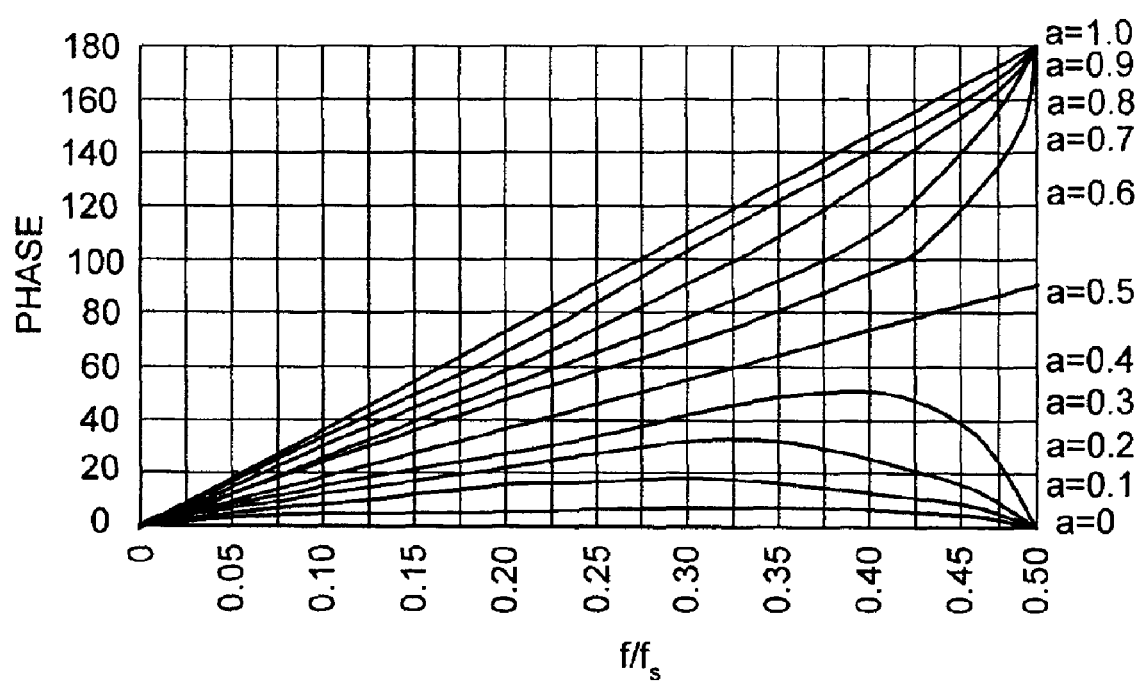
FIG. 22 is a graph of phase versus relative frequency, illustrating a phase response for a four-tap interpolator in accordance with an aspect of the present invention.

The phase response, according to Eq. 20, is depicted in FIG. 22, in which the phase is plotted versus relative frequency for a plurality of positioning vector values. A comparison of the gain and phase responses relative to those previously described herein, demonstrates improved performance, which translates into further improvements in image quality. For example, application of the IQI, as defined above in Eq. 5 for the two-tap interpolator, provides an IQI of 31.653 dB for the four-tap interpolator having the interpolation coefficients of Eqs. 15–18.

Figure 23:
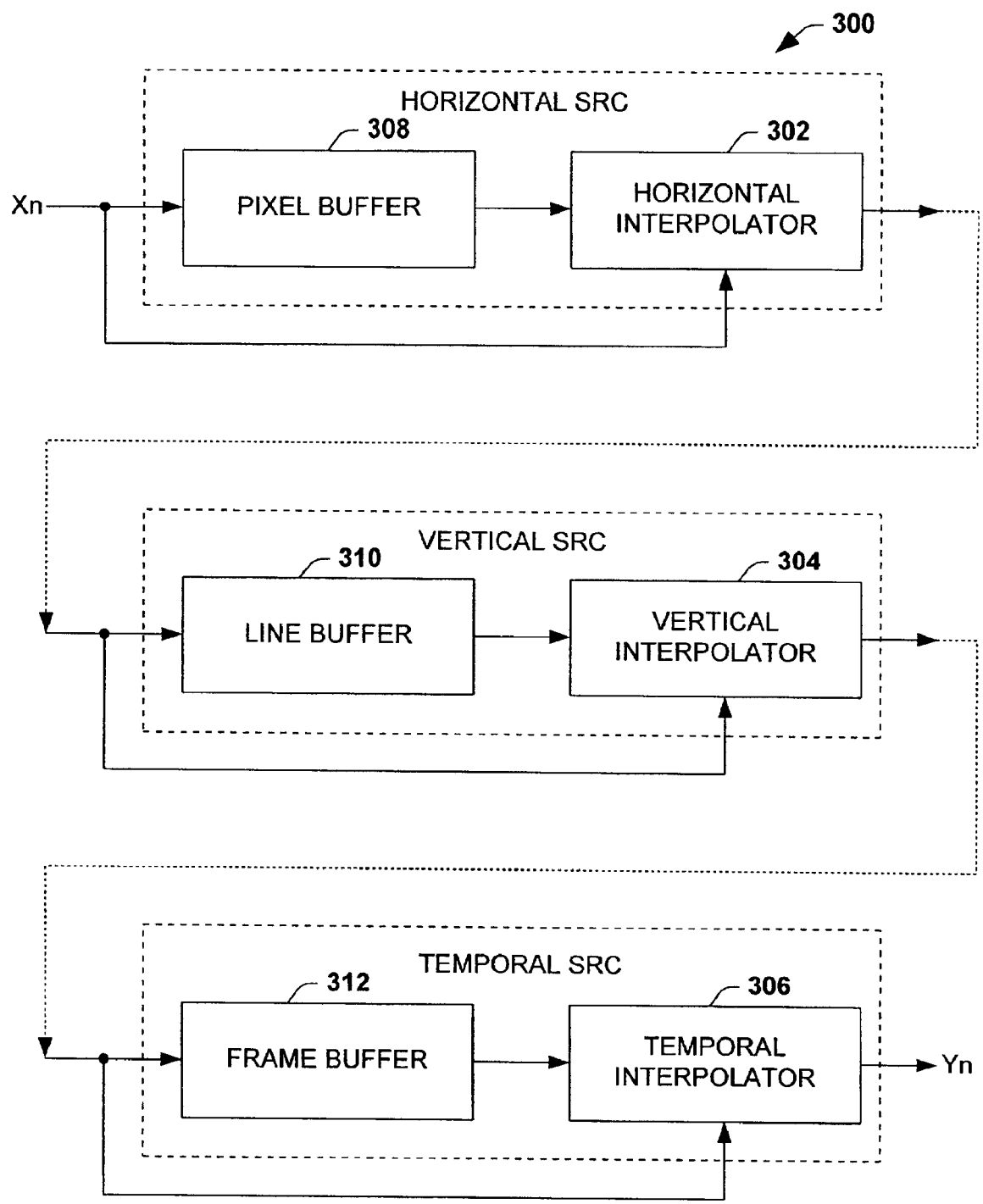
FIG. 23 is an example of a cascade of sample rate converters for implementing different types of interpolation in accordance with an aspect of the present invention.

In view of the various multi-tap filters described above, a system 300 for implementing three-dimensional scaling is illustrated in FIG. 23. In particular, the system 300 includes a cascade of a polyphase interpolation filter 302 for horizontal sample rate conversion, a polyphase interpolation filter 304 for vertical sample rate conversion, and a polyphase interpolation filter 306 for temporal sample rate conversion. It is to be understood and appreciated that the number of taps in each of the respective filters 302, 304, 306 can be the same or different. Each of the filters 302, 304, 306 is associated with a respective buffer (or register) 308, 310, 312. While separate buffers 308, 310, and 312 are illustrated in the example of FIG. 23, it is to be understood and appreciated that a set of one or more buffers could be implemented for storing pixel data needed for performing desired scaling in each of the filters. At least some (one or more) of the filters 302, 304 and 306 are programmed and/or configured so that their respective interpolation coefficients are all non-linear with respect to an associated positioning vector in accordance with an aspect of the present invention.

By way of example, the number of taps for each of the filters 302, 304, 306, for example, can vary for a given application and the design parameters (e.g., cost, size, etc.) associated therewith. In one case, the horizontal interpolation filter 302 might employ more filter taps (e.g., 5, 7 or 9) than the vertical filter 304 (e.g., 3 taps) and the temporal filter 306 (e.g., 2 taps). It is often desirable to employ fewer taps in the vertical and temporal filters, respectively, due to the large storage requirements for image pixel buffers (or registers) usually required for each additional tap in such filters. That is, when compared to a horizontal interpolation filter, each tap of a vertical filter generally requires an increase in the number of pixel buffers proportional to the number of pixels per line. Similarly, when compared to a vertical interpolation filter, for each filter tap, the temporal filter further requires an increase in the number of image pixel buffers generally proportional to the number of lines per frame. However, filters 302, 304, and 306 programmed and/or configured in accordance with an aspect of the present invention with non-linear interpolation coefficients enable low order filters (e.g., five or less taps) to be employed and still achieve desirable image quality with reduced flicker.

Figure 24:
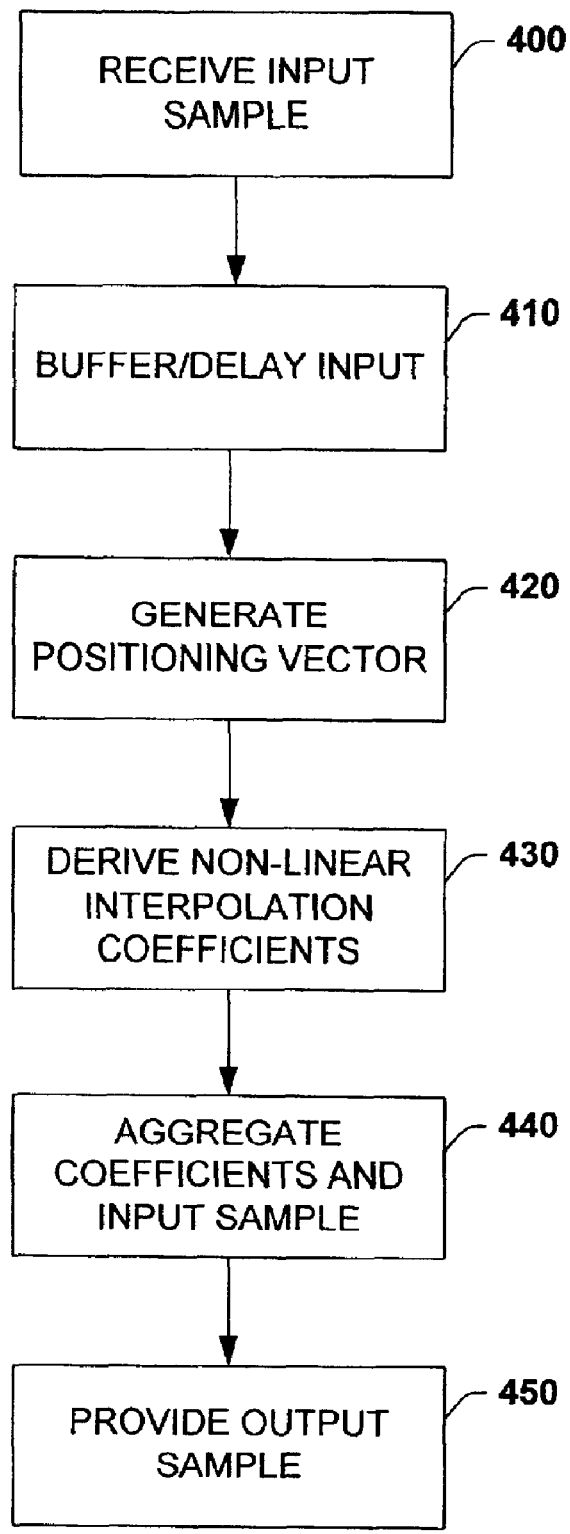
FIG. 24 is a flow diagram illustrating a methodology for implementing low-order interpolation for sample rate conversion in accordance with an aspect of the present invention.

In view of the foregoing structural and functional features described above, a methodology for sample rate conversion, in accordance with an aspect of the present invention, will be better appreciated with reference to FIG. 24. While, for purposes of simplicity of explanation, the methodology of FIG. 24 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. The methodology can be implemented as digital and/or analog circuitry, such as an ASIC, and/or as executable instructions programmed in a Digital Signal Processor.

The methodology begins at 400, in which an input sample is received at a filter dimensioned and configured in accordance with an aspect of the present invention. The filter is multi-tap interpolation filter programmed and/or configured to perform desired sample rate conversion. The interpolation filter, for example, can implement horizontal, vertical, and/or temporal scaling. The type of filter and other design considerations generally will determine a suitable number of filter taps to employ. At 410, the input signal is buffered/delayed to facilitate interpolation of the input signal. The amount of input samples that is buffered will generally vary according to the type of scaling (e.g., horizontal, vertical, temporal) being performed and the number of taps implemented by the filter.

At 420, a positioning vector is generated based on the input sample and the scaling factor being implemented. The positioning vector can be derived by a discrete time oscillator that clocks the input sample at a rate according to the type of scaling being performed. For example, for a given input sample can be clocked through the discrete time oscillator to provide an indication as to the address of the input sample (or pixel) together with a position of the output sample relative to the input sample. The relative position between the output sample and the input sample corresponds to the positioning vector.

Next, at 430, non-linear interpolation coefficients are generated based on the positioning vector generated at 420. The number of interpolation coefficients corresponds to the number of taps. The interpolation coefficients can be stored in a lookup table for a given order filter and/or be derived by a suitable optimization technique relating to image quality. The interpolation coefficients, for example, can be derived based on the positioning vector by optimizing an image quality indicator, such as described herein. The resulting interpolation coefficients are non-linear with respect to the positioning vector. This helps mitigate timing uncertainties at higher frequencies as well as provides desirable image quality with reduced aliasing and flicker, as described herein.

At 440, the coefficients derived at 430 are aggregated with the input sample, such as by multiplication. Associated delay elements, which vary depending on the type of scaling being performed (e.g., horizontal, vertical, temporal) and the number of taps, also are associated with the respective coefficients and input sample. Then, at 450, a corresponding output sample is provided, which output sample is functionally related to a set of input samples, the non-linear interpolation coefficients and associated delay elements.

In view of the foregoing, those skilled in the art will understand and appreciate that the present invention provides a system and method that reduces the number filter taps required in an interpolation filter by employing interpolation coefficients that improve group delay at higher spatial frequencies. This is in contrast to current trends, which usually increase the number of taps of a scaler filter to enhance such performance. Thus, by employing the principles disclosed herein, the interrelationship of performance (e.g., image quality) versus complexity can be improved, to facilitate video encoding processes.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A low-order interpolation filter for video or image signals, comprising:
   a positioning vector generator operative to generate a positioning vector indicative of a desired position of an output sample relative to a set of input samples according to a scaling factor; and
   a coefficient generator that generates interpolation coefficients as a function of the positioning vector, each of the interpolation coefficients varying non-linearly with respect to the positioning vector, the coefficients being associated with the input sample to provide a scaled output sample,
   wherein the positioning vector generator further comprising a discrete time oscillator that derives the positioning vector and a pixel address based on the input sample and the scaling factor.

2. The filter of claim 1, the coefficient generator further comprising a lookup table preprogrammed with coefficient values that are selected based on the positioning vector.

3. The filter of claim 1, further comprising a memory configured to store input sample data according to a mode of scaling being performed and a number of filter taps associated with the filter.

4. The filter of claim 3, the mode of scaling being performed comprising at least one of horizontal scaling, vertical scaling, and temporal scaling.

5. The filter of claim 3, the number of filter taps being less than or equal to five.

6. The filter of claim 3, the number of filter taps being selected depending on the mode of scaling being performed.

7. A low-order interpolation filter for video or image signals, comprising:
   a positioning vector generator operative to generate a positioning vector indicative of a desired position of an output sample relative to a set of input samples according to a scaling factor;
   a coefficient generator that generates interpolation coefficients as a function of the positioning vector, each of the interpolation coefficients varying non-linearly with respect to the positioning vector, the coefficients being associated with the input sample to provide a scaled output sample; and
   the output sample being represented by $Y_n = C_0 \cdot X_n + C_1 \cdot X_n \cdot Z^{-1} \ldots + C_{m-1} \cdot X_n \cdot Z^{-(m-1)}$, where $Y_n$ defines the output sample, $X_n$ defines the Input sample, m defines the number of filter taps, $C_0$ through $C_{m-1}$ define respective interpolation coefficients, and $Z^{-1}$ through $Z^{-(m-1)}$ define delay elements associated with scaling being performed.

8. The filter of claim 7, the delay elements $Z^{-1}$ through $Z^{-(m-1)}$ being indicative of an amount of delay associated with buffering the input sample $X_n$, the amount of delay being proportional to a type of scaling being performed.

9. A sample rate converter that converts a set of input samples at a first clock frequency into an output sample at a second clock frequency, comprising:
   a positioning vector generator operative to provide a positioning vector based on the set of input samples and a desired scaling factor functionally related to the first and second clock frequencies;
   a delay component that delays the input sample and generates delay elements related to delays associated with processing the set of input samples; and
   a low order interpolator that performs linear interpolation on the set of input samples by selectively applying a number of interpolation coefficients and corresponding delay elements to the set of input samples so as to transform the set of input samples into the output sample, the interpolation coefficients varying non-linearly with respect to the positioning vector.

10. The converter of claim 9, the interpolator further comprising a lookup table preprogrammed with the interpolation coefficients, the lookup table providing the interpolation coefficients based on the positioning vector.

11. The converter of claim 9, the delay component generating the delay elements according to a type of scaling being implemented by the converter.

12. The converter of claim 11, the type of scaling being selected from a group comprising horizontal scaling, vertical scaling and temporal scaling.

13. The converter of claim 11, the number of interpolation coefficients being less than or equal to five.

14. The converter of claim 9, the interpolator generating the output sample as $Y_n = C_0 \cdot X_n + C_1 \cdot X_n \cdot Z^{-1} \ldots + C_{m-1} \cdot X_n \cdot Z^{-(m-1)}$, where $Y_n$ defines the output sample, $X_n$ defines an input sample, m defines a number of filter taps of the interpolator, $C_0$ through $C_{m-1}$ define respective interpolation coefficients, and $Z^{-1}$ through $Z^{-(m-1)}$ define delay elements associated with scaling being performed.

15. The converter of claim 14, the delay elements $Z^{-1}$ through $Z^{-(m-1)}$ being indicative of an amount of delay associated with buffering the input sample $X_n$, the amount of delay being proportional to a type of scaling being performed.

16. A method for sample rate conversion, comprising:
   generating a positioning vector indicative of a desired relative position of an output sample relative to a set of input samples;
   applying a number of interpolation coefficients to the set of input samples to weight the set of input samples and, in turn, convert the set of input samples from an input clock frequency to an associated output clock frequency, the interpolation coefficients varying non-linearly with respect to the positioning vector; and
   further comprising generating the output sample as $Y_n = C_0 \cdot X_n + C_1 \cdot X_n \cdot Z^{-1} \ldots + C_{m-1} \cdot X_n \cdot Z^{-(m-1)}$, where $Y_n$ defines the output sample, $X_n$ defines an input sample, m defines the number of interpolation coefficients, $C_0$ through $C_{m-1}$ define respective interpolation coefficients, and $Z^{-1}$ through $Z^{-(m-1)}$ define delay elements that identity delay associated with a type of scaling being performed.

17. The method of claim 16, further comprising buffering the input sample, the delay elements $Z^{-1}$ through $Z^{-(m-1)}$ being indicative of an amount of delay associated with the buffering which depends on the type of scaling being performed.

* * * * *